US007822355B2

(12) United States Patent
Schlitz

(10) Patent No.: US 7,822,355 B2
(45) Date of Patent: Oct. 26, 2010

(54) METHOD AND DEVICE TO PREVENT DUST AGGLOMERATION ON CORONA ELECTRODES

(75) Inventor: Daniel J. Schlitz, Marietta, GA (US)

(73) Assignee: Ventiva, Inc., Santa Clara, CA (US)

( * ) Notice: Subject to any disclaimer, the term of this patent is extended or adjusted under 35 U.S.C. 154(b) by 337 days.

(21) Appl. No.: 12/011,219

(22) Filed: Jan. 23, 2008

(65) Prior Publication Data

US 2008/0199208 A1 Aug. 21, 2008

Related U.S. Application Data

(60) Provisional application No. 60/886,497, filed on Jan. 24, 2007.

(51) Int. Cl.

*G03G 21/20* (2006.01)
*G03G 15/02* (2006.01)
*H01T 19/04* (2006.01)
*H01T 23/00* (2006.01)
*H02H 1/00* (2006.01)
*B03C 3/00* (2006.01)
*B03C 3/41* (2006.01)

(52) U.S. Cl. ......................... 399/100; 399/92; 399/170; 250/324; 250/325; 250/326; 361/230; 361/231; 361/212; 361/213; 95/78; 96/60; 96/96; 96/97

(58) Field of Classification Search .................. 399/92, 399/100, 170; 250/324–326; 361/230, 231, 361/212, 213; 95/78; 96/60, 96, 97
See application file for complete search history.

(56) References Cited

U.S. PATENT DOCUMENTS 3,894,852 A 7/1975 Von Berkheim
3,942,006 A 3/1976 Hayne
3,953,772 A 4/1976 Zimmer
3,965,400 A 6/1976 Tolliver (Continued)

FOREIGN PATENT DOCUMENTS

WO WO 2006/079111 7/2006

OTHER PUBLICATIONS

International Search Report issued Jul. 8, 2008 in corresponding PCT/US08/51790.

*Primary Examiner*—David P Porta
*Assistant Examiner*—Mindy Vu
(74) *Attorney, Agent, or Firm*—Mark J. Danielson; Pillsbury Winthrop Shaw Pittman LLP

(57) ABSTRACT

The present invention is related to preventing dust agglomeration on a sharp electrode which is used for generating corona. According to certain aspects, the invention includes a dust shroud which decreases or prevents dust accumulation on the sharp electrodes. The dust shroud changes the gas flow path so as to reduce the amount of gas passing near the sharp electrode. An advantage of the shroud is that it prevents dust from building up on the electrodes. The shroud is a simple, passive addition to the electrostatic pump, such that the pump is otherwise able to operate normally throughout its life. In embodiments, the shroud can be used to protect a corona electrode used in heat sink applications especially in electronics cooling. It can also be used in electrostatic precipitators for cleaning dust or chemical or microbe particles from air.

19 Claims, 2 Drawing Sheets

U.S. PATENT DOCUMENTS

| | | | | |
|---|---|---|---|---|
| 3,978,379 | A | 8/1976 | DelVecchio | |
| 4,008,057 | A | 2/1977 | Gelfand et al. | |
| 4,019,055 | A | 4/1977 | Derleth | |
| 4,038,546 | A | 7/1977 | Jasinski | |
| 4,050,802 | A * | 9/1977 | Tanaka et al. | 399/93 |
| 4,318,718 | A | 3/1982 | Utsumi et al. | |
| 4,581,675 | A * | 4/1986 | Kelly | 361/228 |
| 4,734,580 | A | 3/1988 | Rodrigo et al. | |
| 4,811,050 | A | 3/1989 | Tanjo et al. | |
| 4,846,857 | A | 7/1989 | Tachibana | |
| 4,864,363 | A | 9/1989 | Shinada | |
| 4,885,466 | A | 12/1989 | Koichi et al. | |
| 4,922,303 | A * | 5/1990 | Takeda et al. | 399/92 |
| 4,956,671 | A | 9/1990 | Otsuka | |
| 4,984,019 | A | 1/1991 | Folkins | |
| 5,012,093 | A | 4/1991 | Shimizu | |
| 5,023,748 | A | 6/1991 | Okamoto et al. | |
| 5,182,694 | A | 1/1993 | Endo | |
| 5,384,623 | A | 1/1995 | Ohashi et al. | |
| 5,485,255 | A | 1/1996 | Reuschle et al. | |
| 5,594,532 | A | 1/1997 | Tuvesson et al. | |
| 5,697,019 | A | 12/1997 | Kim | |
| 5,742,874 | A * | 4/1998 | Koshimura et al. | 399/100 |
| 5,761,578 | A | 6/1998 | Cousoulis et al. | |
| 5,940,656 | A | 8/1999 | Hensel | |
| 6,350,417 | B1 | 2/2002 | Lau et al. | |
| 6,397,024 | B1 * | 5/2002 | Rejewski et al. | 399/92 |
| 6,580,885 | B2 | 6/2003 | Walgrove, III et al. | |
| 6,709,484 | B2 | 3/2004 | Lau et al. | |
| 6,749,667 | B2 | 6/2004 | Reeves et al. | |
| 6,868,242 | B2 | 3/2005 | Walgrove, III et al. | |
| 6,908,501 | B2 | 6/2005 | Reeves et al. | |
| 6,972,057 | B2 | 12/2005 | Lau et al. | |
| 2006/0169441 | A1 | 8/2006 | Schlitz | |

* cited by examiner

METHOD AND DEVICE TO PREVENT DUST AGGLOMERATION ON CORONA ELECTRODES

CROSS-REFERENCE TO RELATED APPLICATIONS

The present application claims priority from U.S. Prov. Appln. No. 60/886,497, filed Jan. 24, 2007, the contents of which are incorporated herein by reference in their entirety.

FIELD OF THE INVENTION

The present invention relates to electrostatic gas pumps, and more particularly to methods and apparatuses for preventing dust agglomeration on a sharp electrode used in an electrostatic gas pump, such as for generating a corona.

BACKGROUND

An electrostatic gas pump consists of one or more sharp (corona) and blunt (neutralizing) electrodes separated by a gas gap. An electric field is applied between the two electrodes causing a partial breakdown of the gas, referred to as a corona discharge, near the sharp electrode. The discharge produces ions which are attracted to the neutralizing electrode. En route, the ions collide with neutral gas molecules creating pressure head and flow similar to that produced by a mechanical fan.

U.S. patent application Ser. No. 11/338,617, Jan. 23, 2006, titled "Electro-hydrodynamic Gas Flow Cooling System," the contents of which are incorporated herein by reference in their entirety, dramatically advanced the state of the art of electrostatic gas pumps. Nevertheless, the present inventors recognize that certain opportunities for improvement remain. For example, formation of corona typically requires a small-dimensioned sharp electrode. The present inventors recognize, however, that as dust accumulates on the sharp electrode, its effective size increases. This leads to a decrease in the maximum electric field strength and a decrease in ion production. Over time, dust can altogether stop the corona discharge. The dust is carried by the gas. As it flows past any surface, including the sharp electrode, it can stick. Once the dust has attached to a surface it tends to stay and accumulate.

Some prior art methods and devices have been developed that attempt to address this issue. Generally, these devices typically work using one of the following active techniques and additional mechanisms: a) compressed gas ejected from a nozzle onto the sharp electrode cleans debris; b) frictional cleaning using a cleaning pad or other device; c) vibration of the sharp electrode to remove debris.

For example, in U.S. Pat. No. 4,318,718, titled "Discharge wire cleaning device for an electric dust collector," dust accumulated on a corona discharge wire is cleaned using compressed gas ejected from a nozzle. In U.S. Pat. No. 6,868,242, titled "Mechanism and method for cleaning corona wires," a corona discharge wire extends through a hole with a cleaning pad, and motion of cleaning pad frictionally cleans the discharge wire. In U.S. Pat. No. 6,580,885, titled "Automatic mechanism for cleaning corona wires," a cleaning pad is wrapped around circumference of the corona wire for wiping the surface. Moving the holding means along the length of the corona wire cleans it. In U.S. Pat. No. 5,940,656, titled "Apparatus for cleaning toner supply cartridge corona wire," a cleaning assembly with a polishing element mounted in it slides along the length of the corona wire and frictionally cleans it. In U.S. Pat. No. 5,761,578, "Corona wire cleaning by mechanical vibration of the wire," a corona wire is vibrated at different frequencies to shake particles off the wire. In U.S. Pat. No. 5,697,019, titled "Cleaning device of corona charging unit in image forming apparatus," a cleaning device has a guide slit that contains a bore in it and slides along the guide slit. The bore has a cleaning shaft with a handle which frictionally cleans the corona wire. In U.S. Pat. No. 5,594,532, titled "Cartridge, cartridge cleaning apparatus and method for cleaning a corona wire," the corona wire is frictionally cleaned using a felt piece. The felt piece is attached to a plastic arm which is operated manually. In U.S. Pat. No. 5,485,255, titled "Automatic cleaning mechanism for a corona charger using cleaning pad," the corona wire and grid is frictionally cleaned using a cleaning pad. In U.S. Pat. No. 5,384,623, titled "Process control stabilizing system including a cleaning device for the corona wires," the corona wire is frictionally cleaned. The need for cleaning is detected using sensors which measure surface potential or optical density. In U.S. Pat. No. 5,182,694, titled "Corona discharging apparatus with automatic cleaning mechanism for corona wire," several cleaning units are employed from different directions to clean the corona wire frictionally. In U.S. Pat. No. 5,023,748, titled "Corona wire cleaning device for a corona unit," a cleaning member rubs the corona wire as it slides along a case using a driving pulley. In U.S. Pat. No. 5,012,093, titled "Cleaning device for wire electrode of corona discharger," a corona wire electrode is cleaned by relative movement of the wire electrode and a cleaning member which is driven using a motor. In U.S. Pat. No. 4,956,671, titled "Wire cleaning device for a corona discharge type charger," a pair of cleaning pads move relative to the corona wire and frictionally clean it. In U.S. Pat. No. 4,885,466, titled "Corona wire cleaning device utilizing a position detection system," a cleaning device has a movable cleaner for cleaning a charging wire in a corona discharger, and a motor for moving the cleaner. In U.S. Pat. No. 4,864,363, titled "Cleaning device for a corona discharger," a cleaner pad rubs against the corona wire. The cleaner pad is driven by a feed screw. In U.S. Pat. No. 4,811,050, titled "Apparatus for the forming of images with a cleaning device for a corona wire," the corona wire is part of the removable body of the system. A cleaning pad touches the corona wire when that body is being removed. In U.S. Pat. No. 4,038,546, titled "Cleaning apparatus for a corona generating device," a block containing cleaning pads slides along a U-shaped shield which surrounds the corona wire. In U.S. Pat. No. 4,019,055, titled "Corona cleaning assembly," a wiper is in contact with the electrode wire and movement of the wiper cleans the wire. The device also contains a shield which partially surrounds the electrode. In U.S. Pat. No. 3,978,379, titled "Corona generating device with an improved cleaning mechanism," a cleaning member, impregnated with abrasives, is in contact with the electrode wire and movement of this member cleans the wire. The device also contains a shield which partially surrounds the electrode. In U.S. Pat. No. 3,965,400, titled "Corona generating device with improved built-in cleaning mechanism," a wiper is in contact with the electrode wire and movement of the wiper cleans the wire. The device also contains a shield which partially surrounds the electrode. In U.S. Pat. No. 3,953,772, titled "Cleaning of corona electrodes," corona electrode wires are cleaned by periodically inducing vibrations in the wire, either by controlled mechanical plucking, or by electromagnetically or electrostatically inducing vibrations. In U.S. Pat. No. 3,942,006, titled "Corona generator cleaning apparatus," a wiper moves along the corona wires and grid wires to frictionally remove dust. In U.S. Pat. No. 6,972,057, titled "Electrode cleaning for air conditioner devices," a corona wire electrode is cleaned frictionally using a flexible Mylar type sheet material or by passing a bead-like member along the length of the wire. Relative motion of cleaning body and wire electrode occurs when collector electrode is being removed for cleaning. In U.S. Pat. No. 6,908,501, titled “Electrode self-cleaning mechanism for air conditioner devices,” a corona wire electrode passes through a cleaning member which has an opening. The cleaning member is moved along the wire and frictionally cleans it. In U.S. Pat. No. 6,749,667, titled “Electrode self-cleaning mechanism for electro-kinetic air transporter-conditioner devices,” a corona wire electrode passes through a bead member which has a bore. The bead moves along the wire and frictionally cleans it. In U.S. Pat. No. 6,709,484, titled “Electrode self-cleaning mechanism for electro-kinetic air transporter conditioner devices,” a corona wire electrode is cleaned frictionally using a flexible Mylar type sheet material or by passing a bead-like member along the length of the wire. In U.S. Pat. No. 6,350,417, titled “Electrode self-cleaning mechanism for electro-kinetic air transporter-conditioner devices,” a corona wire electrode is cleaned frictionally using a flexible Mylar type sheet material or by passing a bead-like member along the length of the wire. In U.S. Pat. No. 4,984,019, titled “Electrode wire cleaning,” the electrode wire is vibrated to remove contaminants. In U.S. Pat. No. 4,734,580, titled “Built-in ionizing electrode cleaning apparatus,” brushes with bristles are mounted near the electrode wire and can clean the wire frictionally. In U.S. Pat. No. 4,008,057, titled “Electrostatic precipitator electrode cleaning system,” electrodes are cleaned using electrically-activated shaking devices.

All these and other prior art methods and devices for solving the dust issue are corrective as compared to preventive, and further require active intervention by additional structures and mechanisms. Moreover, they clean the electrode after it has already been covered with dust, and often after operational performance has suffered or stopped as a result of the accumulated dust. The present inventors recognize that benefits could be gained by preventing dust from getting to the sharp electrode in the first place instead, among other things.

SUMMARY OF THE INVENTION

The present invention is related to preventing dust agglomeration on a sharp electrode which is used for generating corona. According to certain aspects, the invention includes a dust shroud which decreases or prevents dust accumulation on the sharp electrodes. The dust shroud changes the gas flow path so as to reduce the amount of gas passing near the sharp electrode. An advantage of the shroud is that it prevents dust from building up on the electrodes. The shroud is a simple, passive addition to the electrostatic pump, such that the pump is otherwise able to operate normally throughout its life. In embodiments, the shroud can be used to protect a corona electrode used in heat sink applications especially in electronics cooling. It can also be used in electrostatic precipitators for cleaning dust or chemical or microbe particles from air.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Generally, the invention provides methods and apparatuses to decrease or prevent dust accumulation on one or more of a pair of electrodes in an electrostatic gas pump. Preferably, the dust shroud changes the gas flow path so as to reduce the amount of gas passing near the protected electrode.

Figure 1:
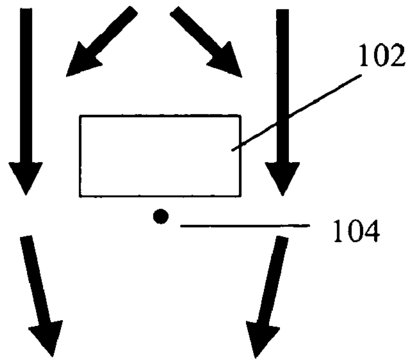
FIG. 1 illustrates certain broad aspects of a dust shroud for a sharp electrode in accordance with the invention.

According to certain general aspects of the invention, as shown in FIG. 1, a shroud 102 is located adjacent to a sharp electrode 104 that is used together with a blunt electrode (not shown) in an electrostatic gas pump. In one possible example, sharp electrode 104 is a wire. Using electrohydronamic gas pumping techniques such as those described in the co-pending application U.S. application Ser. No. 11/338,617, for example, a gas flow is created in a direction from the sharp electrode 104 to the blunt electrode, as indicated by the arrows in FIG. 1. The shroud 102 is preferably disposed upstream of the sharp electrode 104 with respect to the direction of gas flow created by the electrostatic pumping mechanism, such that it diverts the flow of gas around the sharp electrode 104. Since dust is typically otherwise carried by the gas to the sharp electrode 104, reducing the flow also reduces the exposure to dust. The shroud 102 thus greatly reduces the rate of dust build-up on the sharp electrode 104, without substantially increasing the fluid drag.

The principles of the invention encompass many different shapes and materials that can be used to shroud the corona electrode, as shown in FIGS. 2A to 2C. As shown in FIG. 2A, the shroud 202A's upstream edge can be streamlined in any number of ways to lower the flow resistance. Moreover, as shown in FIG. 2B, the corona electrode 204B can be located inside a cavity in the shroud 202B. As shown in FIG. 2C, the corona electrode 204C can be in contact with the shroud 202C, or not in contact with the shroud. Still further, the shroud can be conductive or non-conductive.

Figure 2:
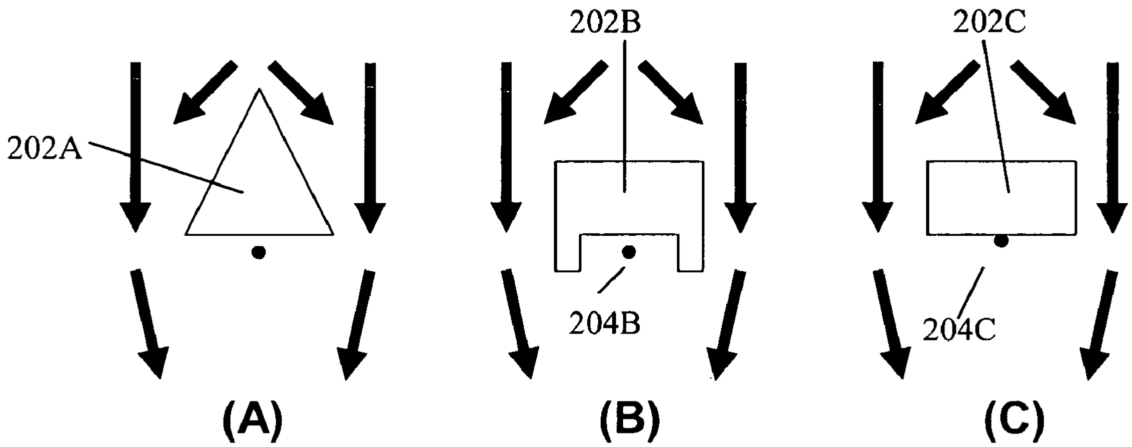
FIGS. 2A to 2C illustrate several possible embodiments of the dust shroud according to the invention.

It should be further noted that the invention can be practiced with many different types of electrodes in addition to a corona electrode wire having a circular cross section as shown in FIGS. 1 and 2, and so the depictions of the sharp electrode in these figures should be considered representative, and not limiting. For example, co-pending application Ser. No. 11/338,617 discloses various types of sharp electrodes, including those having sharp tips and non-circular extruded shapes, and the present invention can be practiced in these embodiments, among others.

An advantage of the shroud is that it prevents dust from building up on one or more of the electrodes in an electrostatic pair. Otherwise, the corona discharge element is able to operate normally throughout its life. According to aspects of the invention, the shroud is a simple, passive addition to the electrostatic pump, in contrast with prior art techniques that require active and sometimes complex mechanisms for removing dust buildup.

The principles of the invention can be applied to a corona discharge used in an electrostatic gas pump or in a variety of electrostatic precipitators. In the case where the corona is being used as an electrostatic pump for a cooling system, such as a cooling system disclosed in co-pending U.S. application Ser. No. 11/338,617, for example, a preferred setting of the dust shroud is shown in FIGS. 3A and 3B.

Figure 3:
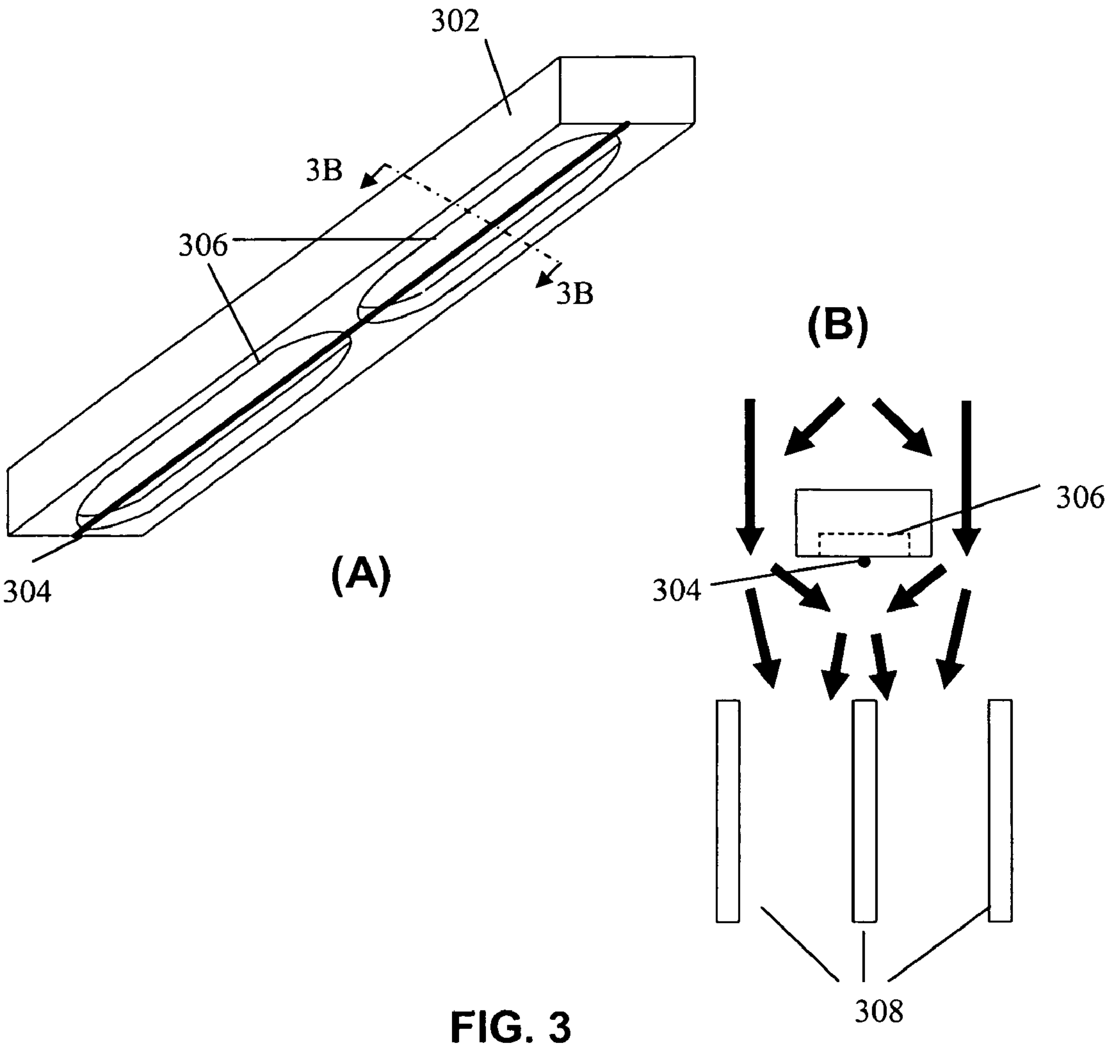
FIGS. 3A and 3B illustrate one example application of a dust shroud according to the invention in an electrohydrodynamic cooling system.

In the example embodiment shown in FIG. 3A, shroud 302 is a dielectric and is offset from the corona electrode 304. The offset aids in the generation of ions. In these types of applications the corona electrode 304 is typically a 1 to 50 μm diameter wire and the offset is about 10 to 200 μm from the dielectric. The width of shroud 302 need only be 3 to 5 times wider than the corona electrode, although practical considerations may necessitate a wider dimension.

As further shown in FIG. 3B, which is a view taken along cross-sectional line 3B-3B in FIG. 3A, the shroud 302 further includes one or more cavities 306 that provide the offset between the corona electrode 304 and the dielectric material of the shroud 302. As further shown in FIG. 3B, shroud 302 is disposed upstream from corona electrode 304 with respect to the flow of gas (e.g. air) created by the electrostatic pumping action between sharp electrode 304 and blunt electrodes 308, which can be comprised of a heat sink fin material such as aluminum. Accordingly, the cooling effect of the flow of gas through the heat sink fins is not reduced due to the presence of shroud 302.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A device for decreasing or preventing dust accumulation in an electrostatic discharge element, the element creating an electrohydrodynamic gas flow in correspondence with the electrostatic discharge, the device comprising:

a dust shroud disposed adjacent to a sharp electrode of the electrostatic discharge element in an upstream location from the sharp electrode with respect to a direction of the gas flow created by the electrostatic discharge element so as to thereby substantially block the gas flow from impinging on the sharp electrode and prevent dust carried by the gas flow from impinging on the sharp electrode, wherein the dust shroud comprises substantially solid edges that are streamlined with respect to the direction of the gas flow so as to simultaneously substantially block the gas flow from impinging on the sharp electrode without substantially increasing a fluid drag of the gas flow toward a blunt electrode of the electrostatic discharge element.

2. A device according to claim 1, wherein the dust shroud changes the gas flow so as to reduce the amount of gas passing near the sharp electrode.

3. A device according to claim 2, wherein the shroud includes a cavity that partially surrounds the sharp electrode.

4. A device according to claim 2, wherein the shroud is offset from the sharp electrode in the direction of the gas flow.

5. A device according to claim 2, wherein the shroud is in contact with the sharp electrode.

6. A device according to claim 2, wherein the shroud has a first portion with a larger width than a width of the sharp electrode with respect to the direction of the gas flow.

7. A device according to claim 6, wherein the shroud has a second portion with a smaller width than the first portion, the second portion being located upstream from the first portion with respect to the direction of the gas flow.

8. A method for decreasing or preventing dust accumulation in an electrostatic discharge element, the element creating an electrohydrodynamic gas flow in correspondence with the electrostatic discharge, the method comprising:

disposing a dust shroud adjacent to a sharp electrode of the electrostatic discharge element in an upstream location from the sharp electrode with respect to a direction of the gas flow created by the electrostatic discharge element so as to thereby substantially block the gas flow from impinging on the sharp electrode and prevent dust carried by the gas flow from impinging on the sharp electrode, wherein the disposing step includes configuring the dust shroud with substantially solid edges that are streamlined with respect to the direction of the gas flow so as to simultaneously substantially block the gas flow from impinging on the sharp electrode without substantially increasing a fluid drag of the gas flow toward a blunt electrode of the electrostatic discharge element.

9. A method according to claim 8, further comprising:

configuring the dust shroud to change the gas flow so as to reduce the amount of gas passing near the sharp electrode.

10. A method according to claim 9, further comprising:

providing a cavity in the shroud that partially surrounds the sharp electrode.

11. A method according to claim 9, wherein the disposing step includes providing an offset between the sharp electrode and the shroud in the direction of the gas flow.

12. A method according to claim 9, wherein the disposing step includes providing contact between the sharp electrode and the shroud.

13. A method according to claim 9, wherein the configuring step includes configuring the shroud to have a first portion with a larger width than a width of the sharp electrode with respect to the direction of the gas flow.

14. A method according to claim 13, wherein the configuring step further includes configuring the shroud with a second portion having a smaller width than the first portion, the second portion being located upstream from the first portion with respect to the direction of the gas flow.

15. A device comprising:

an electrostatic discharge element including a corona electrode for creating an electrohydrodynamic gas flow in correspondence with an electrostatic discharge; and a dust shroud disposed upstream from the corona electrode of the electrostatic discharge element with respect to a direction of the gas flow created by the electrostatic discharge element so as to thereby substantially block the gas flow from impinging on the sharp electrode and prevent dust carried by the gas flow from impinging on the corona electrode, wherein the dust shroud comprises substantially solid edges that are streamlined with respect to the direction of the gas flow so as to simultaneously substantially block the gas flow from impinging on the corona electrode without substantially increasing a fluid drag of the gas flow toward a blunt electrode of the electrostatic discharge element, and wherein the corona electrode has a cross-section of less than 100 μm.

16. A device according to claim 15, wherein the corona electrode comprises a wire.

17. A device according to claim 16, wherein the dust shroud comprises a dielectric material.

18. A device according to claim 15, wherein the dust shroud is offset about 10 to 200 μm from the corona electrode.

19. A device according to claim 15, wherein a width of shroud is less than 5 times that of the corona electrode cross-section.

* * * * *